US012573364B2

(12) United States Patent
Ling

(10) Patent No.: US 12,573,364 B2
(45) Date of Patent: Mar. 10, 2026

(54) AUDIO DATA PROCESSING METHOD, ELECTRONIC DEVICE, AND NON-TRANSITORY COMPUTER-READABLE STORAGE MEDIUM

(71) Applicant: REALME CHONGQING MOBILE TELECOMMUNICATIONS CORP., LTD., Chongqing (CN)

(72) Inventor: Huadong Ling, Chongqing (CN)

(73) Assignee: REALME CHONGQING MOBILE TELECOMMUNICATIONS CORP., LTD., Chongqing (CN)

( * ) Notice: Subject to any disclaimer, the term of this patent is extended or adjusted under 35 U.S.C. 154(b) by 176 days.

(21) Appl. No.: 18/404,141

(22) Filed: Jan. 4, 2024

(65) Prior Publication Data

US 2024/0153480 A1 May 9, 2024

Related U.S. Application Data

(63) Continuation of application No. PCT/CN2022/096971, filed on Jun. 2, 2022.

(30) Foreign Application Priority Data

Jul. 16, 2021 (CN) ......................... 202110808650.9

(51) Int. Cl.
*G10K 11/178* (2006.01)
*H04R 1/10* (2006.01)

(52) U.S. Cl.
CPC ....... *G10K 11/1781* (2018.01); *H04R 1/1083* (2013.01); *G10K 2210/1081* (2013.01); *H04R 2460/01* (2013.01)

(58) Field of Classification Search
CPC ....... G10K 11/1781; G10K 2210/1081; H04R 1/1083; H04R 2460/01
(Continued)

(56) References Cited

U.S. PATENT DOCUMENTS

2009/0016541 A1* 1/2009 Goldstein ............ H04R 1/1083 381/373
2011/0064240 A1 3/2011 Litvak et al.
(Continued)

FOREIGN PATENT DOCUMENTS

CN 102449687 A 5/2012
CN 105979415 A 9/2016
(Continued)

OTHER PUBLICATIONS

Information and Computer, Jul. 31, 2013, Zhang Yaqi; Audio User Experience Optimization Based on User, Environment, and Source Characteristics; pp. 199-200, 1-11.
(Continued)

*Primary Examiner* — Vivian C Chin
*Assistant Examiner* — Douglas J Suthers
(74) *Attorney, Agent, or Firm* — Ladas & Parry LLP

(57) ABSTRACT

An audio data processing method, an electronic device, and a non-transitory computer-readable storage medium are provided. The method includes: obtaining a current audio-playback mode of the audio playback device; in response to the current audio playing mode being an active noise cancellation mode, obtaining an ambient sound, performing characteristic analysis on a preset-frequency-band signal generated from an ambient sound signal, and obtaining a first low-frequency-band (LFB) signal characteristic value corresponding to the ambient sound; performing characteristic analysis on a preset-frequency-band signal generated from an audio signal played by the audio playback device, and obtaining a second LFB signal characteristic value corresponding to the audio signal; and adjusting a feedback noise-reduction parameter of the audio playback device based on the second LFB signal characteristic value, in
(Continued)

response to the first LFB signal characteristic value being greater than a first preset threshold value.

20 Claims, 8 Drawing Sheets

(58) Field of Classification Search
USPC .......................................................... 381/71.6
See application file for complete search history.

(56) References Cited

U.S. PATENT DOCUMENTS

| | | | | |
|---|---|---|---|---|
| 2011/0135086 | A1* | 6/2011 | Sun | H04M 1/6016 379/392.01 |
| 2013/0083939 | A1 | 4/2013 | Fellers et al. | |
| 2019/0174222 | A1* | 6/2019 | Luo | H04R 1/1083 |
| 2020/0380945 | A1* | 12/2020 | Woodruff | G10K 11/178 |

FOREIGN PATENT DOCUMENTS

| | | | |
|---|---|---|---|
| CN | 106792315 | A | 5/2017 |
| CN | 107124149 | A | 9/2017 |
| CN | 206713027 | U | 12/2017 |
| CN | 110197670 | A | 9/2019 |
| CN | 110972007 | A | 4/2020 |
| CN | 110996215 | A | 4/2020 |
| CN | 111698593 | A | 9/2020 |
| CN | 111885460 | A | 11/2020 |
| CN | 111970609 | A | 11/2020 |
| CN | 112687286 | A | 4/2021 |
| CN | 112954530 | A | 6/2021 |
| CN | 112969130 | A | 6/2021 |
| CN | 113556654 | A | 10/2021 |
| EP | 3107312 | A1 | 12/2016 |
| EP | 3745736 | A1 | 12/2020 |
| JP | 2007110532 | A | 4/2007 |

OTHER PUBLICATIONS

«APSIPA ASC 2019»,Dec. 31, 2019;Kenta , Audio Integrated Active Noise Control System with Auto Gain Controller; pp. 1819-1823, 1-11.

Chinese First Office Action, Chinese Application No. 202110808650.9, mailed Apr. 25, 2022 (15 pages).

Notification to Grant Patent Right for Invention, Chinese Application No. 202110808650.9, mailed Aug. 19, 2022 (5 pages).

International Search Report and Written Opinion, International Application No. PCT/CN2022/096971, mailed Aug. 23, 2023 (16 pages).

European Search Report, European Patent Application No. 22841078.3, mailed Aug. 23, 2024 (72 pages).

* cited by examiner

AUDIO DATA PROCESSING METHOD, ELECTRONIC DEVICE, AND NON-TRANSITORY COMPUTER-READABLE STORAGE MEDIUM

CROSS REFERENCE TO RELATED APPLICATIONS

This application is a continuation of International Patent Application No. PCT/CN2022/096971, filed Jun. 2, 2022, which claims priority to Chinese Patent Application No. 202110808650.9, filed Jul. 16, 2021, in the China National Intellectual Property Administration, both of which are herein incorporated by reference in their entirety.

TECHNICAL FIELD

The present disclosure relates to the technical field of electronic devices, and in particular to an audio data processing method, an electronic device, and a non-transitory computer-readable storage medium.

BACKGROUND

In recent years, with the development of electronic device technologies, audio playback devices are also constantly improved. For example, a headset has many different playback modes. Processing parameters for different playing modes affect a quality of a playback audio.

However, in the related technical solution, an audio loss is generally compensated through an equalizer. When a compensated digital gain is too large, large distortion and noise are easy to occur. When a level of music sound pressure is high, overload distortion noise may also occur.

SUMMARY

In a first aspect, an audio data processing method performed by an audio playback device is provided and includes: obtaining a current audio-playback mode of the audio playback device; in response to the current audio playing mode being an active noise cancellation mode, obtaining an ambient sound, performing characteristic analysis on a preset-frequency-band signal generated from an ambient sound signal, and obtaining a first low-frequency-band (LFB) signal characteristic value corresponding to the ambient sound; performing characteristic analysis on a preset-frequency-band signal generated from an audio signal played by the audio playback device, and obtaining a second LFB signal characteristic value corresponding to the audio signal; and adjusting a feedback noise-reduction parameter of the audio playback device based on the second LFB signal characteristic value, in response to the first LFB signal characteristic value being greater than a first preset threshold value.

In a second aspect, an electronic device including a memory and one or more processors is provided. The memory stores a computer-readable instruction, in response to the computer-readable instruction being executed by the one or more processors, the one or more processors perform operations including: obtaining a current audio-playback mode of the audio playback device; in response to the current audio playing mode being an active noise cancellation mode, obtaining an ambient sound, performing characteristic analysis on a preset-frequency-band signal generated from an ambient sound signal, and obtaining a first low-frequency-band (LFB) signal characteristic value corresponding to the ambient sound; performing characteristic analysis on a preset-frequency-band signal generated from an audio signal played by the audio playback device, and obtaining a second LFB signal characteristic value corresponding to the audio signal; and adjusting a feedback noise-reduction parameter of the audio playback device based on the second LFB signal characteristic value, in response to the first LFB signal characteristic value being greater than a first preset threshold value.

In a third aspect, a non-transitory computer-readable storage medium storing one or more computer-readable instructions is provided. In response to computer-readable instructions being executed by one or more processors, the one or more processors perform operations including: obtaining a current audio-playback mode of the audio playback device; in response to the current audio playing mode being an active noise cancellation mode, obtaining an ambient sound, performing characteristic analysis on a preset-frequency-band signal generated from an ambient sound signal, and obtaining a first low-frequency-band (LFB) signal characteristic value corresponding to the ambient sound; performing characteristic analysis on a preset-frequency-band signal generated from an audio signal played by the audio playback device, and obtaining a second LFB signal characteristic value corresponding to the audio signal; and adjusting a feedback noise-reduction parameter of the audio playback device based on the second LFB signal characteristic value, in response to the first LFB signal characteristic value being greater than a first preset threshold value.

BRIEF DESCRIPTION OF THE DRAWINGS

In order to make the technical solution described in some embodiments of the present disclosure more clearly, the drawings used for description of some embodiments or the related art are described. Apparently, the drawings in the following description only illustrate some embodiments of the present disclosure. For those skilled in the art, other drawings may be acquired according to the drawings without any creative work.

DETAILED DESCRIPTION

In order to make the purpose, technical solution and technical effect of some embodiments of the present disclosure more clearly, the present disclosure is further described in detail below in combination with the drawings and some embodiments. It should be understood that the following embodiments described here are only used to explain the present disclosure, not to limit the present disclosure.

Figure 1:
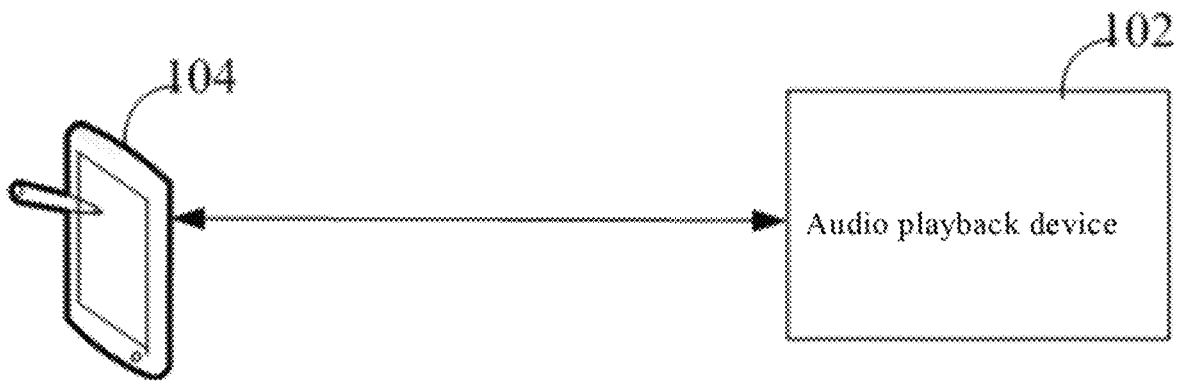
FIG. 1 is a schematic diagram of an application environment of an audio data processing method according to some embodiments of the present disclosure.

FIG. 1 is a schematic diagram of an application environment of an audio data processing method according to some embodiments of the present disclosure. As shown in FIG. 1, the application environment includes an audio playback device 102 and a terminal 104, the audio playback device 102 and the terminal 104 may be arranged separately or integrally. The audio playback device 102 may be a headset, such as a Bluetooth headset or a wired headset, etc. The audio playback device 102 may include a feedforward microphone and a feedback microphone. The terminal 104 may be a personal computer, a laptop, a smart phone, a tablet computer, or a portable wearable device, etc., which is not limited.

Figure 2:
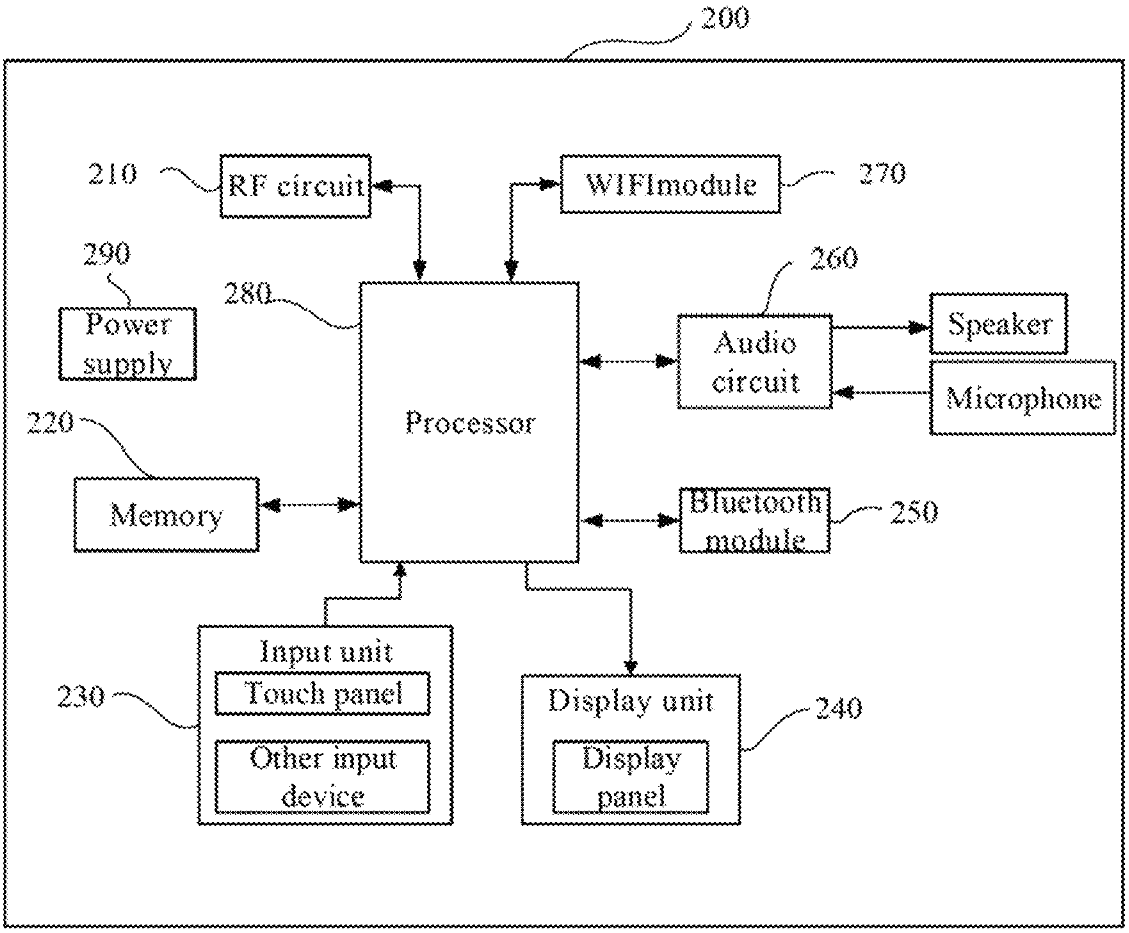
FIG. 2 is a block diagram of parts of a structure of a mobile phone related to an electronic device according to some embodiments of the present disclosure.

In some possible implementations, FIG. 2 is a block diagram of parts of a structure of a mobile phone related to an electronic device according to some embodiments of the present disclosure. As shown in FIG. 2, the mobile phone 200 includes: a radio frequency (RF) circuit 210, a memory 220, an input unit 230, a display unit 240, a Bluetooth module 250, an audio circuit 260, a wireless fidelity (WIFI) module 270, a processor 280, a power supply 290, and other components. The input unit 230 at least includes a video input device, such as a camera. Those skilled in the art may understand that the structure of the mobile phone 200 shown in FIG. 2 does not provide limitation to the mobile phone. The mobile phone may include more or fewer components than the mobile phone 200 shown in FIG. 2, or may be combined with some components, or may have different components. The Bluetooth module 250 supports a Bluetooth function. A Bluetooth technology is a wireless technology that supports short distance communication of devices, and may implement wireless information interaction between multiple wireless terminal devices including smart phones, personal computers, laptops, tablets, portable wearable devices, wireless headsets, wireless speakers, and so on.

Figure 3:
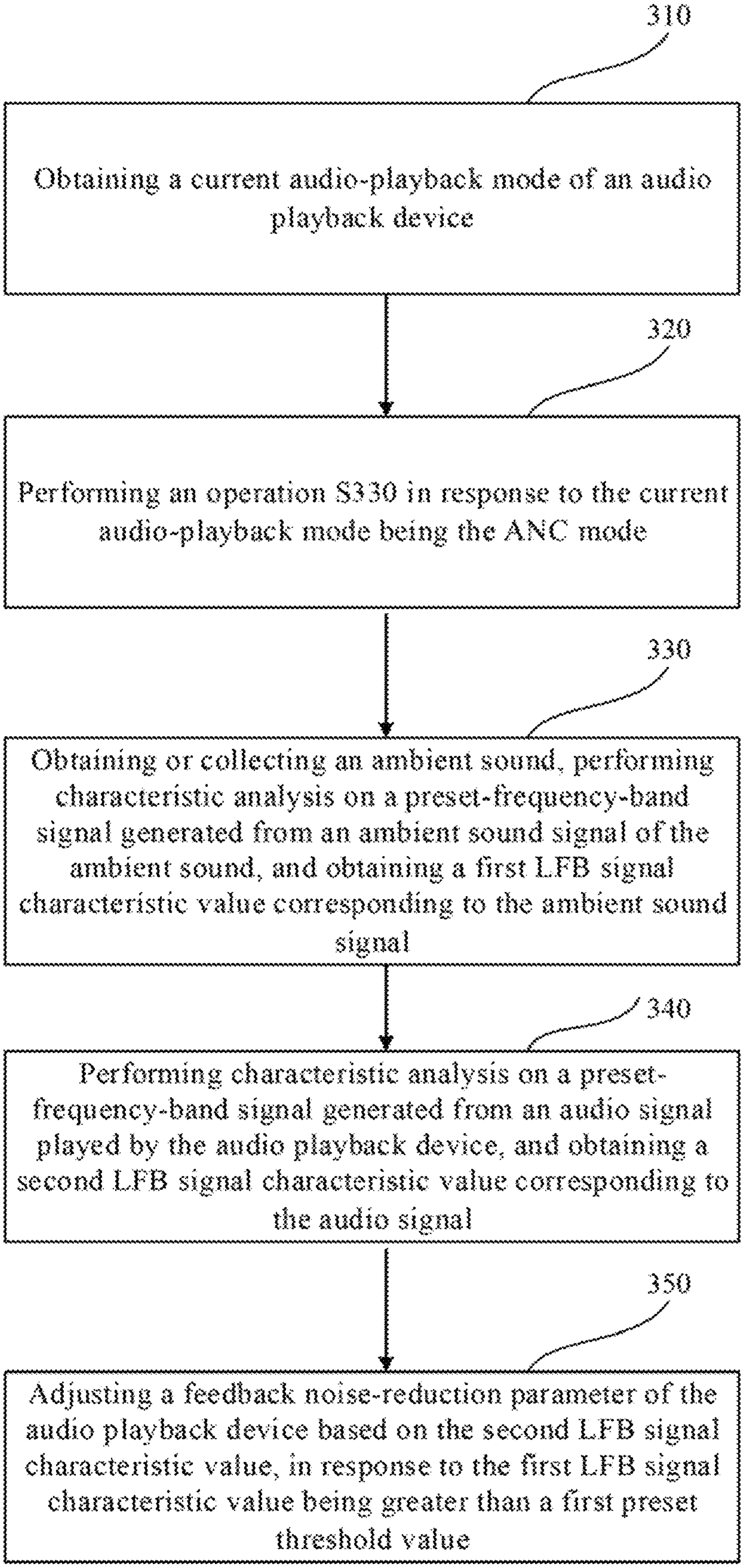
FIG. 3 is a flowchart of an audio data processing method according to some embodiments of the present disclosure.

FIG. 3 is a flowchart of an audio data processing method according to some embodiments of the present disclosure. The audio data processing method shown in FIG. 3 may be applied to or performed by the audio playback device 102, and may include following operations.

An operation 310 includes: obtaining a current audio-playback mode of an audio playback device.

The current audio-playback mode is configured to describe an audio quality mode of the audio playback device when playing an audio. Different current audio-playback modes have different audio quality effects.

It may be understood that, whether the audio playback device is playing an audio is required to judge or determined. The current audio-playback mode is obtained in response to the audio playback device playing an audio. The current audio-playback mode may include an active noise cancellation (ANC) mode and a transparency mode. In the ANC mode, the audio playback device actively reduces an ambient sound of a user wearing the audio playback device, and the user wearing audio playback device may sense reduction of the ambient sound. The transparency mode means that when the user wears the audio playback device, the ambient sound is picked up by a microphone, and a compensation signal for the ambient sound is generated by a digital signal processing (DSP), so that an ambient sound sensed by the user when wearing the audio playback device may be consistent with an ambient sound when the user dose not wear the audio playback device, thereby implementing a sensing effect of not wearing or non-wearing a headset. It may be understood that the current audio-playback mode may also include other audio-playback modes according to configurations of the audio playback device.

An operation 320 includes: performing an operation S330 in response to the current audio-playback mode being the ANC mode.

It may be understood that, a feedback noise-reduction parameter or a transparency parameter is not changed and a default parameter is adopted in response to the audio playback device not playing audio, not being in the ANC mode or the transparency mode. The default parameter may be a feedback parameter with a best or optimal ANC effect or with a best or optimal transparency effect. The default parameter is a feedback parameter that does not consider loss of the played audio, and only gives priority to the best ANC effect or the best transparency effect during project debugging. Parameter debugging is to constantly debug and find a best or optimal set of parameters in a laboratory during a development stage of the audio playback device. As to the best or optimal effect, when implementing subjective and objective tests, for the ANC mode, the more noise is cancelled, the better ANC effect is; and for the transparency mode, the closer transparency is to the ambient sound, the better the transparency effect is. The audio playback device performs the operation S330 in response to the current audio-playback mode being the ANC mode, and the feedback noise-reduction parameter is adjusted through a signal characteristic of a preset low-frequency-band signal generated from the ambient sound and a signal characteristic of a preset low-frequency-band signal generated from the audio signal played by the audio playback device, to obtain a target feedback noise-reduction parameter.

An operation 330 includes: obtaining or collecting an ambient sound, performing characteristic analysis on a preset-frequency-band signal generated from an ambient sound signal of the ambient sound, and obtaining a first low-frequency-band (LFB) signal characteristic value corresponding to the ambient sound signal (the first LFB signal characteristic value is also referred as a characteristic value of a first LFB signal corresponding to the ambient sound signal).

The preset frequency band may be defined as required, for example, the preset frequency band is 50 Hz~700 Hz.

It may be understood that, the ambient sound may be obtained through a microphone. For example, the ambient sound may be obtained through a feedforward microphone, and the characteristic analysis may be performed on the preset-frequency-band signal generated from the ambient sound to obtain a signal characteristic of a preset-frequency-band signal, such as the preset-frequency-band signal at a low-frequency band of 50 Hz~700 Hz, corresponding to the ambient sound signal. A method of performing the characteristic analysis may be defined as required or user-defined.

Figure 4:
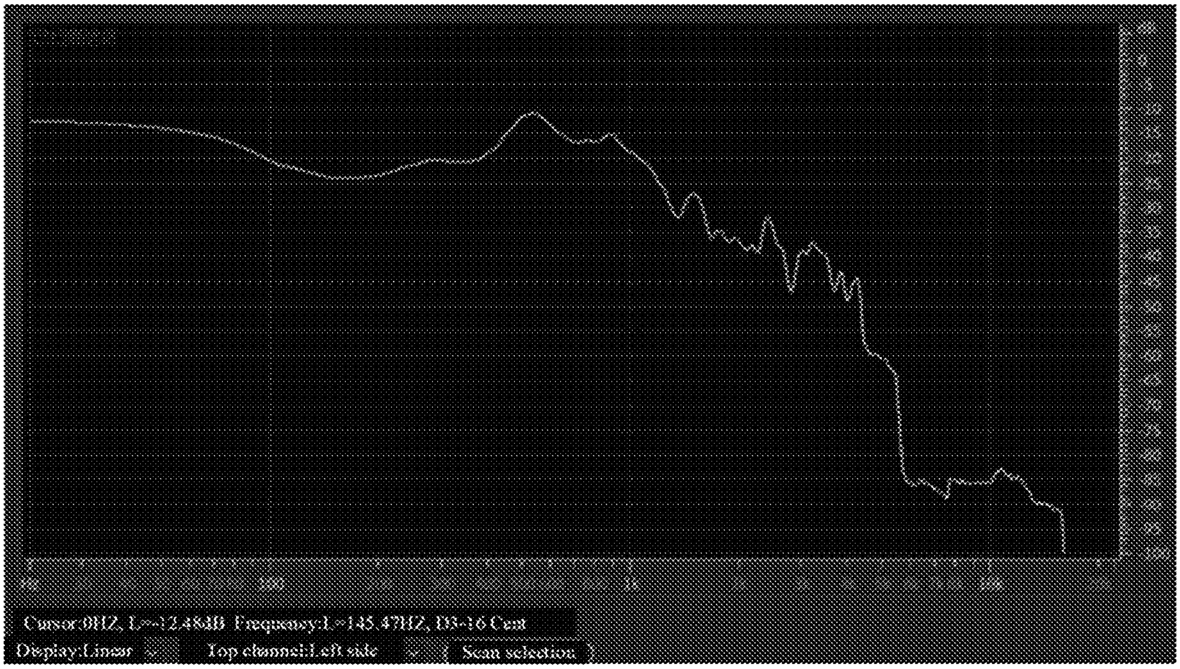
FIG. 4 is a schematic diagram of a loudness value of a low-frequency-band signal corresponding to an ambient sound signal according to some embodiments of the present disclosure.

In some embodiments, fast Fourier transform or wavelet transform is performed on the obtained ambient sound signal to obtain frequency-response distribution data of the ambient sound signal. FIG. 4 is a schematic diagram of a loudness value of a low-frequency-band signal at a frequency band of 20 Hz~-20 KHz corresponding to an ambient sound signal. Based on the frequency-response distribution data of the ambient sound signal, a characteristic value of a first LFB signal, which has a frequency band of such as 50 Hz~700 Hz, corresponding to the ambient sound signal may be obtained. A method for extracting or obtaining the characteristic may be defined as required or user-defined, for example, the characteristic value may be a maximum value or an average value. In some embodiments, the average value is obtained by dividing a sum of noise by the number of statistics. For example, at the low-frequency band, a value is taken every 10 Hz and the number of values is 65, so that the average value is obtained by dividing a sum of 65 values by 65.

An operation 340 includes, performing characteristic analysis on a preset-frequency-band signal generated from an audio signal played by the audio playback device, and obtaining a second LFB signal characteristic value corresponding to the audio signal (the second LFB signal characteristic value is also referred as a characteristic value of a second LFB signal corresponding to the audio signal).

The preset frequency band may be defined as required, for example, the preset frequency band is 50 Hz~700 Hz. It may be understood that the preset frequency band of the audio signal may be the same as or different from the preset frequency band of the ambient sound in the previous operation.

It may be understood that, the method of performing the characteristic analysis on the preset-frequency-band signal generated from the audio signal may be defined as required, which may be the same as or different from the method of performing the characteristic analysis on the preset-frequency-band signal generated from the ambient sound signal in the previous operation. In some embodiments, fast Fourier transform or wavelet transform may be performed on the audio signal played by the audio playback device to obtain frequency-response distribution data of the audio signal. Based on the frequency-response distribution data of the audio signal, a characteristic value of a second LFB signal, which has a frequency band of such as 50 Hz~700 Hz, corresponding to the audio signal may be obtained. A method for extracting or obtaining the characteristic may be defined as required, for example, the characteristic value may be a maximum value or an average value.

An operation 350 includes: adjusting a feedback noise-reduction parameter of the audio playback device based on the second LFB signal characteristic value, in response to the first LFB signal characteristic value being greater than a first preset threshold value.

The feedback noise-reduction parameter includes a gain of a feedback microphone, a filter parameter of a feedback path, etc.

It may be understood that, the first preset threshold may be defined as required. According to the characteristic value of the first LFB signal corresponding to the ambient sound signal, when the ambient sound signal is great at the low-frequency band, the first LFB signal characteristic value is greater than the first preset threshold. For example, when the first preset threshold is a noise-reduction value of feedforward noise reduction at the low-frequency band, only using the feedforward noise reduction cannot completely eliminate or cancel the ambient sound signal at the low-frequency band, so that it is necessary to adjust the feedback noise-reduction parameter of the audio playback device in combination with the second LFB signal characteristic value. The method for adjusting the feedback noise-reduction parameter of the audio playback device in combination with the second LFB signal characteristic value may be defined as required. The second LFB signal characteristic value may be compared with a second preset threshold, and the feedback noise-reduction parameter of the audio playback device may be adjusted according to or based on the comparison result. The second preset threshold may be defined as required, so that the feedback noise-reduction parameter may be dynamically adjusted according to the characteristics of the ambient sound signal and the audio signal, thereby reducing an impact on the sound quality and reducing distortion and noise. In some embodiments, the second LFB signal characteristic value may be matched with a preset characteristic value range. Different characteristic value ranges correspond to different methods for adjusting the feedback noise-reduction parameter of the audio playback device, so that a corresponding target method for adjusting the feedback noise-reduction parameter of the audio playback device may be determined according to or based on a target characteristic value range where the second LFB signal characteristic value is currently located.

The audio data processing method in some embodiments may be applied to or performed by the audio playback device. The current audio-playback mode of the audio playback device is obtained. In response to the current audio-playback mode being the ANC mode, the ambient sound is obtained, the characteristic analysis is performed on the preset-frequency-band signal generated from the ambient sound signal to obtain the first LFB signal characteristic value corresponding to the ambient sound signal, and the characteristic analysis is performed on the preset-frequency-band signal generated from the audio signal played by the audio playback device to obtain the second LFB signal characteristic value corresponding to the audio signal. In response to the first LFB signal characteristic value being greater than the first preset threshold value, the feedback noise-reduction parameter of the audio playback device is adjusted based on the second LFB signal characteristic value. In the ANC mode, in a case where the characteristic of the ambient sound meets a preset condition, different feedback noise-reduction parameters correspond to different second LFB signal characteristic values. Therefore, the feedback noise-reduction parameter may be dynamically adjusted according to or based on the characteristics of the ambient sound signal and the audio signal, thereby reducing the impact of the feedback noise reduction on the quality of the audio signal, reducing distortion and noise, and improving the audio playback quality.

The above embodiments describe how the audio playback device dynamically adjusts the feedback noise-reduction parameter according to the characteristics of the ambient sound signal and the audio signal in the ANC mode, so as to reduce the impact of the feedback noise reduction on the quality of the audio signal, thereby reducing the impact on the audio quality, reducing distortion and noise, and improving the audio playback quality. In addition, other embodiments of the present disclosure also describe how to reduce noise when the first LFB signal characteristic value corresponding to the ambient sound is less than or equal to the first preset threshold value. After the operation 340, the audio data processing method also includes: disabling the feedback noise reduction of the audio playback device in response to the first LFB signal characteristic value being less than or equal to the first preset threshold.

It may be understood that, based on the first LFB signal characteristic value corresponding to the ambient sound signal, when the ambient sound signal is small at the low-frequency band, that is, when the first LFB signal characteristic value corresponding to ambient sound signal is less than or equal to the first preset threshold (the first preset threshold may be defined as required, for example, the first preset threshold may be a noise-reduction value of feedforward noise reduction at the low-frequency band), the low-frequency-band signal generated from the ambient sound signal may be eliminated by only using the feedforward noise reduction. In this case, the feedback noise reduction of the audio playback device may be disabled regardless of the characteristic of the audio signal.

In this embodiment, by comparing the first LFB signal characteristic value corresponding to the ambient sound signal with the first preset threshold value, the small low-frequency-band signal generated from the ambient sound signal is automatically identified, the feedback noise reduction is not required, and the low-frequency-band signal generated from the ambient sound signal may be eliminated by only using the feedforward noise reduction. Therefore, the feedback noise reduction of the audio playback device may be disable to reduce the impact of the feedback noise reduction on the quality of the audio signal.

Figure 5:
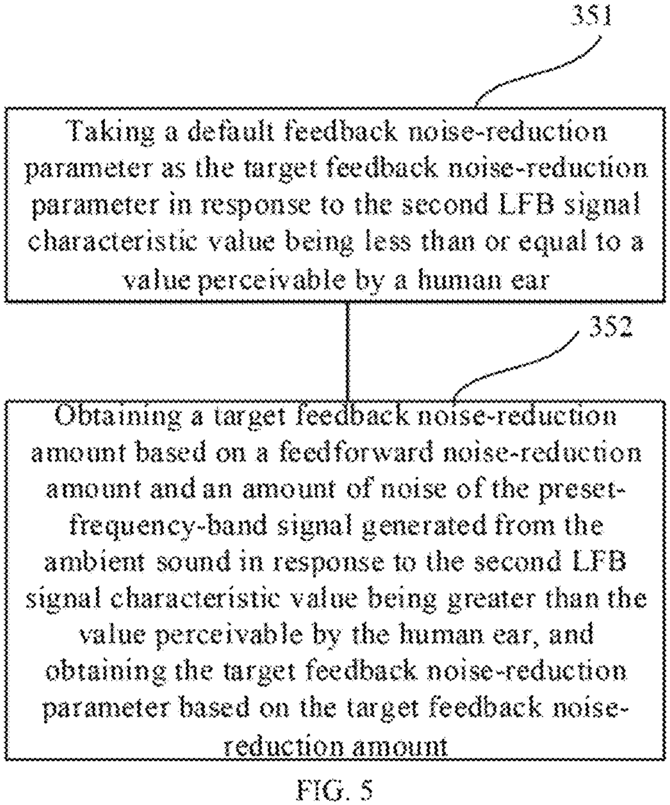
FIG. 5 is a flowchart of adjusting a feedback noise-cancellation parameter of an audio playback device based on a second low-frequency-band signal characteristic value according to some embodiments of the present disclosure.

The above embodiments describe that the audio playback device may automatically identify the small low-frequency-band signal generated from the ambient sound signal according to the first LFB signal characteristic value corresponding to the ambient sound, disable the feedback noise reduction of the audio playback device, quickly complete the noise reduction judgment, and reduce the impact of the feedback noise reduction on the quality of the audio signal. Other embodiments of the present disclosure also describe how to adjust the feedback noise-reduction parameter of the audio playback device based on the second LFB signal characteristic value in response to the first LFB signal characteristic value being greater than the first preset threshold. On the basis of the above embodiments, as shown in FIG. 5, an operation 350 may include following operations.

An operation 351 includes, taking a default feedback noise-reduction parameter as the target feedback noise-reduction parameter in response to the second LFB signal characteristic value being less than or equal to a value perceivable by a human ear.

By playing sweep signals with different sizes at low-frequency band in the audio playback device at a development stage of the whole device, the value perceivable by the human ear may be set according to perception of multiple people.

It may be understood that, based on the second LFB signal characteristic value corresponding to the audio signal, when the audio signal is small at the low-frequency band, that is, when the second LFB signal characteristic value corresponding to the audio signal is less than the value perceivable by the human ear, the impact of the feedback noise reduction on the sound quality may be ignored. Therefore, the target feedback noise-reduction parameter setting adopts an original default parameter, and the parameter may adopt the feedback noise-reduction parameter with the best ANC effect. When the audio signal is small at the low-frequency band, for example, when a total of an average signal strength of sound source signals at the low-frequency band and a sound volume gain is less than −56 dB, if the audio signal at the low-frequency band fails to reach the value perceivable by the human ear, the sound source signals at the low-frequency band are considered to be small, and the impact of the feedback noise reduction on the sound quality may be ignored. Therefore, the feedback noise-reduction parameter may be set to adopt the original default parameter. −56 is acquired by adding the average value of the sound source at the low-frequency band to a corresponding gain of a sound volume level. For example, the average value o of the sound source at the low-frequency band is −50 dB, the sound volume is at 13th level, the number of the sound volume levels is 16 in total, and each sound volume level has attenuation of 2 dB (that is, the signal strength at each next sound volume level is reduced by 2 dB compared with the signal strength at a current sound volume level. −56, the number of the sound volume levels, and the attenuation of each sound volume level are determined by a product design.

An operation 352 includes, obtaining a target feedback noise-reduction amount based on a feedforward noise-reduction amount and an amount of noise of the preset-frequency-band signal generated from the ambient sound in response to the second LFB signal characteristic value being greater than the value perceivable by the human ear, and obtaining the target feedback noise-reduction parameter based on the target feedback noise-reduction amount.

It may be understood that, when the ambient sound signal is large at the low-frequency band and the audio signal is large at the low-frequency band, that is, when the first LFB signal characteristic value is greater than the first preset threshold value and the second LFB signal characteristic value is greater than the value perceivable by the human ear, the feedback noise reduction has a large impact on the sound quality. In this case, it is required to adjust the noise-reduction amount of the feedback noise reduction by adjusting the feedback noise-reduction parameter based on a noise-reduction requirement for the ambient sound signal. The target feedback noise-reduction amount is obtained based on the feedforward noise-reduction amount and the amount of noise of the preset-frequency-band signal generated from the ambient sound, and a calculation formula may be defined as required. The feedforward noise-reduction amount, i.e., a noise-reduction amount when only the feedforward microphone is turned on, is determined in the debugging stage of the audio playback device, and a maximum noise-reduction amount is 25 dB. The amount of noise of the preset-frequency-band signal generated from the ambient sound varies with the ambient sound. The preset frequency band may be defined as required, such as a low-frequency band. The amount of noise of the preset-frequency-band signal generated from the ambient sound may be obtained through the feedforward microphone. The target feedback noise-reduction amount is a required or demanded feedback noise-reduction amount. In some embodiments, the target feedback noise-reduction parameter may be determined according to a relationship between the required feedback noise-reduction amount and a maximum compensable feedback noise-reduction amount. The maximum compensable amount of the feedback noise reduction is predetermined. The feedback noise reduction damages the sound quality. The greater the feedback noise-reduction amount is, the more the low frequency of sound quality loses. When the loss occurs, an equalizer (EQ) is required to compensate for the loss. The greater the compensation is, that is, the greater the EQ gain is, the greater the distortion is. When the distortion exceeds 10%, the user can clearly sense or perceive the distortion. Therefore, it is necessary to ensure that the distortion is within an acceptable range.

When the EQ compensation has a maximum value, a corresponding feedback noise-reduction amount is a maximum compensable feedback noise-reduction amount. In some embodiments, a matching relationship between the feedback noise-reduction amount and the feedback noise-reduction parameter may be obtained in advance, then a target feedback noise-reduction parameter corresponding to the target feedback noise-reduction amount may be determined according to the matching relationship.

In this embodiment, based on the second LFB signal characteristic value corresponding to the audio signal, when the audio signal is small or large at the low-frequency band, that is, when the audio signal is less than or equal to the value perceivable by the human ear or when the audio signal is greater than the value perceivable by the human ear, the feedback noise-reduction parameter may be determined in different ways, so that the feedback noise-reduction parameter may be determined adaptively, thereby reducing the impact of the feedback noise reduction on audio quality, and intelligently improving the audio playback quality.

In some embodiments, the maximum compensable feedback noise-reduction amount is obtained. When the target feedback noise-reduction amount is less than or equal to the maximum compensable feedback noise-reduction amount, the target feedback noise-reduction parameter is obtained according to or based on the target feedback noise-reduction amount. When the target feedback noise-reduction amount is greater than the maximum compensable feedback noise-reduction amount, the target feedback noise-reduction parameter is obtained according to or based on the maximum compensable feedback noise-reduction amount. When the required feedback noise-reduction amount is not greater than (i.e., less than or equal to) the maximum compensable feedback noise-reduction amount, the target feedback noise-reduction parameter is set according to or based on the target feedback noise-reduction amount. When the required feedback noise-reduction amount is greater than the maximum compensable feedback noise-reduction amount, the target feedback noise-reduction parameter is set according to or based on the maximum compensable feedback noise-reduction amount.

The matching relationship between the feedback noise-reduction amount and the feedback noise-reduction parameter may be determined in advance, which may be implemented by objectively debugging a feedback noise-reduction parameter in a headset development stage to obtain a corresponding feedback noise-reduction amount, and outputting a corresponding matching relationship table in the development stage.

It may be understood that, when the required feedback noise-reduction amount, i.e., the target feedback noise-reduction amount is less than or equal to the maximum compensable feedback noise-reduction amount, the target feedback noise-reduction parameter is set according to or based on the target feedback noise-reduction amount. When the required feedback noise-reduction amount is greater than the maximum compensable feedback noise-reduction amount, the target feedback noise-reduction parameter is set according to or based on the maximum compensable feedback noise-reduction amount. Feedback noise-reduction parameters for different feedback noise-reduction amounts may be obtained according to or based on the matching relationship between the feedback noise-reduction amounts and the feedback noise-reduction parameters.

In this embodiment, by comparing the target feedback noise-reduction amount with the maximum compensable feedback noise-reduction amount, the target feedback noise-reduction parameter is determined in different ways according to the comparison result, so that the feedback noise-reduction parameter may be determined adaptively, thereby reducing the impact of the feedback noise reduction on the audio quality, and intelligently improving the audio playback quality.

The above embodiments describe that the audio playback device may determine the target feedback noise-reduction parameter by automatically adopting different ways according to or based on the second LFB signal characteristic value corresponding to the audio signal, so that the feedback noise-reduction parameter may be determined adaptively, thereby reducing the impact of the feedback noise reduction on the audio quality, and intelligently improving the audio playback quality. In addition, other embodiments of the present disclosure also describe how to obtain the target feedback noise-reduction amount. On the basis of the above embodiments, the target feedforward noise-reduction mount is calculated by the following formula: |feedforward noise-reduction amount+target feedback noise-reduction amount|=|amount of noise of the preset-frequency-band signal generated from the ambient sound|.

It may be understood that, when the feedforward noise-reduction amount and the amount of noise of the preset-frequency-band signal generated from the ambient sound are acquired, the target feedback noise-reduction amount may be calculated by substituting the above two values into the formula |feedforward noise-reduction amount+target feedback noise-reduction amount|=|amount of noise of the preset-frequency-band signal generated from the ambient sound|, where | | represents taking an absolute value.

In this embodiment, the target feedback noise-reduction amount may be quickly calculated according to the feedforward noise-reduction amount and the amount of noise of the preset-frequency-band signal generated from the ambient sound in the formula, thereby improving a convenience and an accuracy of determining the target feedback noise-reduction amount.

Figure 6:
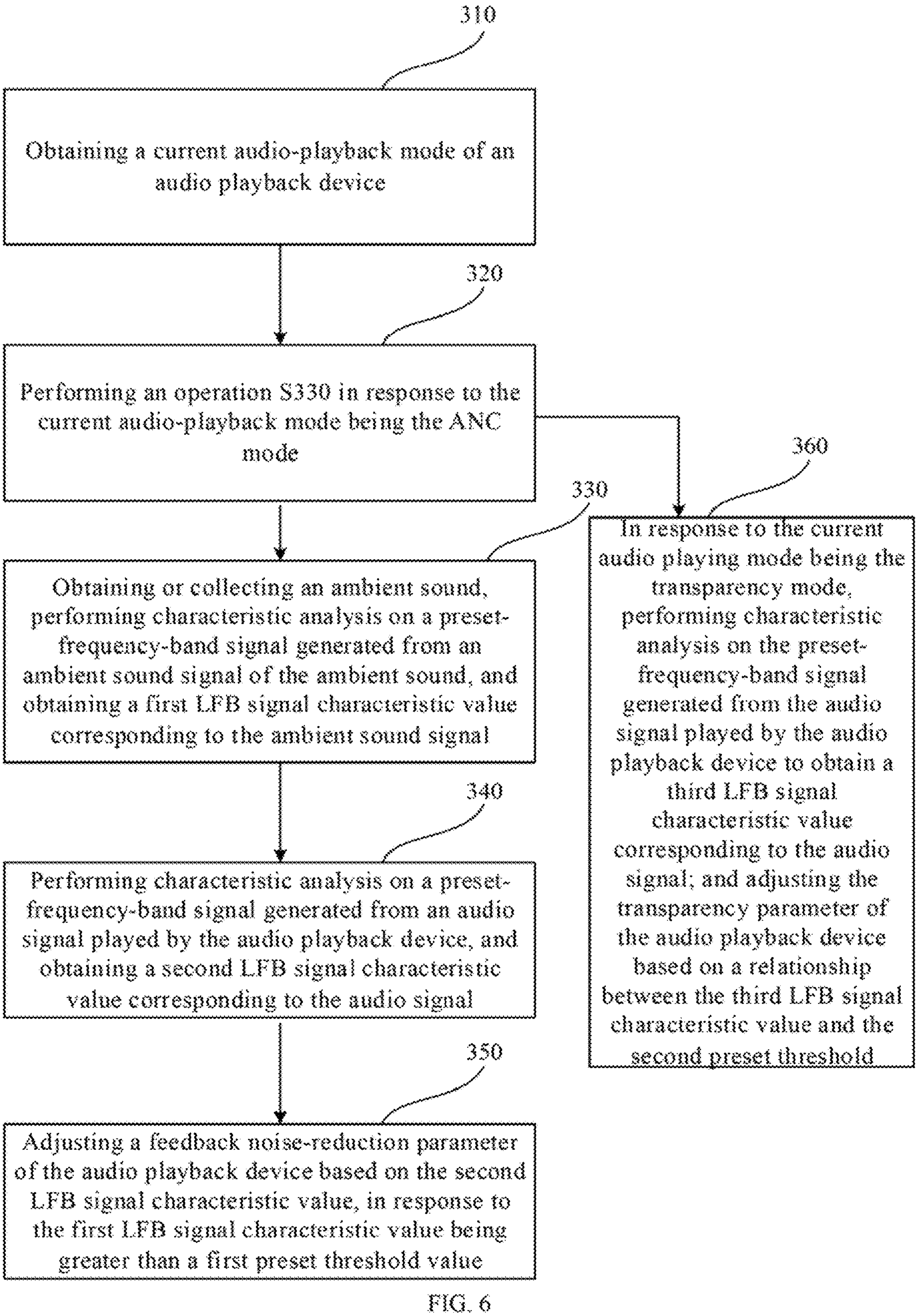
FIG. 6 is a flowchart of an audio data processing method according to some embodiments of the present disclosure.

The above embodiments describe that the target feedback noise-reduction amount may be quickly calculated through the formula, so as to improve the convenience and accuracy of determining the target feedback noise-reduction amount. In addition, other embodiments of the present disclosure also describe how to adjust the transparency parameter of the audio playback device according to the characteristic of the audio signal played by the audio playback device in response to the current audio-playback mode being the transparency mode. On the basis of the above embodiments, after the operation 320, as shown in FIG. 6, an operation 360 is performed and the operation 360 includes: in response to the current audio playing mode being the transparency mode, performing characteristic analysis on the preset-frequency-band signal generated from the audio signal played by the audio playback device to obtain a third LFB signal characteristic value corresponding to the audio signal (the third LFB signal characteristic value corresponding to the audio signal is also referred as a characteristic value of a third LFB signal corresponding to the audio signal); and adjusting the transparency parameter of the audio playback device based on a relationship between the third LFB signal characteristic value and the second preset threshold.

The preset frequency band may be defined as required, for example, the preset frequency band is 50 Hz~700 Hz. It may be understood that the preset frequency band of the audio signal in the transparency mode may be the same as or different from the preset frequency band of the ambient sound in the ANC mode in the above operations, or the preset frequency band of the audio signal in the ANC mode. The second preset threshold value may be defined as required. In some embodiments, the second preset threshold value is the value perceivable by the human ear.

It may be understood that, the method of performing the characteristic analysis on the preset-frequency-band signal generated from the audio signal in the transparency mode may be defined as required, which may be the same as or different from the method of performing the characteristic analysis on the preset-frequency-band signal generated from the ambient sound signal in the ANC mode and the method of performing the characteristic analysis on the preset-frequency-band signal generated from the audio signal in the ANC mode. In some embodiments, in the transparency mode, fast Fourier transform or wavelet transform is performed on the audio signal played by the audio playback device to obtain the frequency-response distribution data of the audio signal. According to the frequency-response distribution data of the audio signal, the third LFB signal characteristic value corresponding to the audio signal, such as the characteristic value of the third LFB signal at a low-frequency band of 50 Hz~700 Hz, may be obtained. The method for extracting or obtaining the characteristic may be defined as required, for example, the characteristic value may be a maximum value or an average value. The transparency parameter of the audio playback device is adjusted based on the relationship between the third LFB signal characteristic value and the second preset threshold. The adjustment method may be defined as required. In some embodiments, a first method is configured to determine the transparency parameter of the audio playback device in response to the third LFB signal characteristic value being less than or equal to the second preset threshold, and a second method is configured to determine the transparency parameter of the audio playback device in response to the third LFB signal characteristic value being greater than the second preset threshold. The first method is different from the second method. The transparency parameter is a parameter in a corresponding transparency mode.

In this embodiment, based on the third LFB signal characteristic value corresponding to the audio signal, when the audio signal is small or large at the low-frequency band, the transparency parameter of the audio playback device may be determined in different ways, so that the transparency parameter may be determined adaptively, thereby reducing the impact of the transparency parameter on the audio quality, and intelligently improving the audio playback quality.

Figure 7:
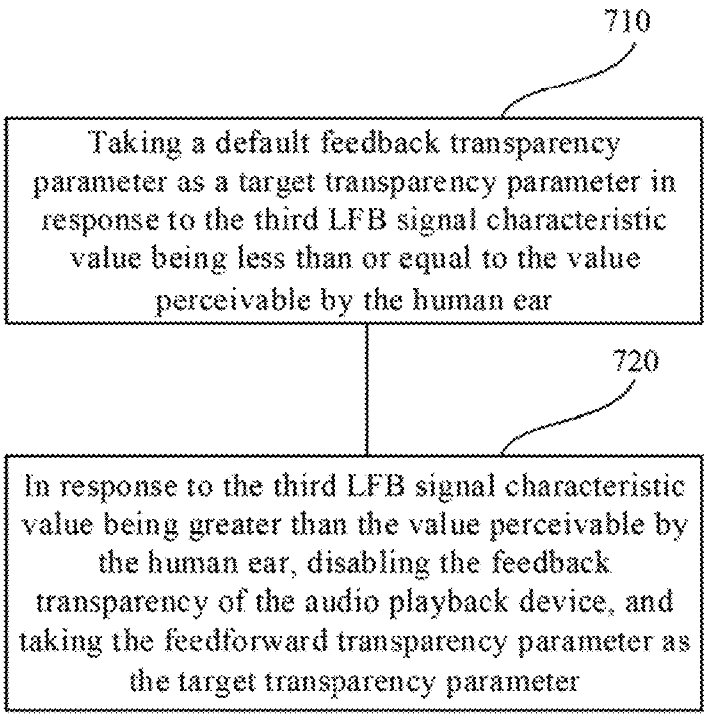
FIG. 7 is a flowchart of adjusting a transparency parameter of an audio playback device based on a relationship between a first low-frequency-band signal characteristic value and a second preset threshold according to some embodiments of the present disclosure.

The above embodiments describe that the audio playback device may determine the transparency parameter in different ways according to the second LFB signal characteristic value corresponding to the audio signal, so that the transparency parameter may be determined adaptively, thereby reducing the impact of the transparency parameter on the audio quality, and intelligently improving the audio playback quality. In addition, other embodiments of the present disclosure also describe how to adjust the transparency parameter of the audio playback device according to the relationship between third LFB signal characteristic value and the second preset threshold value. On the basis of the above embodiment, as shown in FIG. 7, the adjusting the transparency parameter of the audio playback device based on a relationship between the third LFB signal characteristic value and the second preset threshold may include following operations.

An operation 710 includes: taking a default feedback transparency parameter as a target transparency parameter in response to the third LFB signal characteristic value being less than or equal to the value perceivable by the human ear.

It may be understood that, based on the third LFB signal characteristic value corresponding to the audio signal, when the audio signal is small at the low-frequency band, that is, when the third LFB signal characteristic value corresponding to the audio signal at the low-frequency band is less than the value perceivable by the human ear, the impact of the feedback transparency on the sound quality may be ignored. Therefore, a target transparency parameter setting may adopt an original default parameter, and this parameter may be a feedback transparency parameter with a best transparency effect.

An operation 720 includes: in response to the third LFB signal characteristic value being greater than the value perceivable by the human ear, disabling the feedback transparency of the audio playback device, and taking the feedforward transparency parameter as the target transparency parameter.

It may be understood that, based on the third LFB signal characteristic value corresponding to the audio signal, when the audio signal is large at the low-frequency band, that is, when the third LFB signal characteristic value corresponding to the audio signal at the low-frequency band is greater than the value perceivable by the human ear, the feedback transparency has a greater impact on the audio quality. Therefore, the feedback transparency of the audio playback device is disabled, and the feedforward transparency parameter is taken as the target transparency parameter.

In this embodiment, the third LFB signal characteristic value corresponding to the audio signal is compared with the value perceivable by the human ear. Based on the comparison result, the default feedback transparency parameter is selected, or the feedback transparency of the audio playback device is disabled and the feedforward transparency parameter is selected. When the audio signal is small or large at the low-frequency band, a matching target transparency parameter is adaptively selected and a target transparency parameter is dynamically set, thereby reducing the impact of transparency parameter on the audio quality and improving the audio playback quality.

Figure 8:
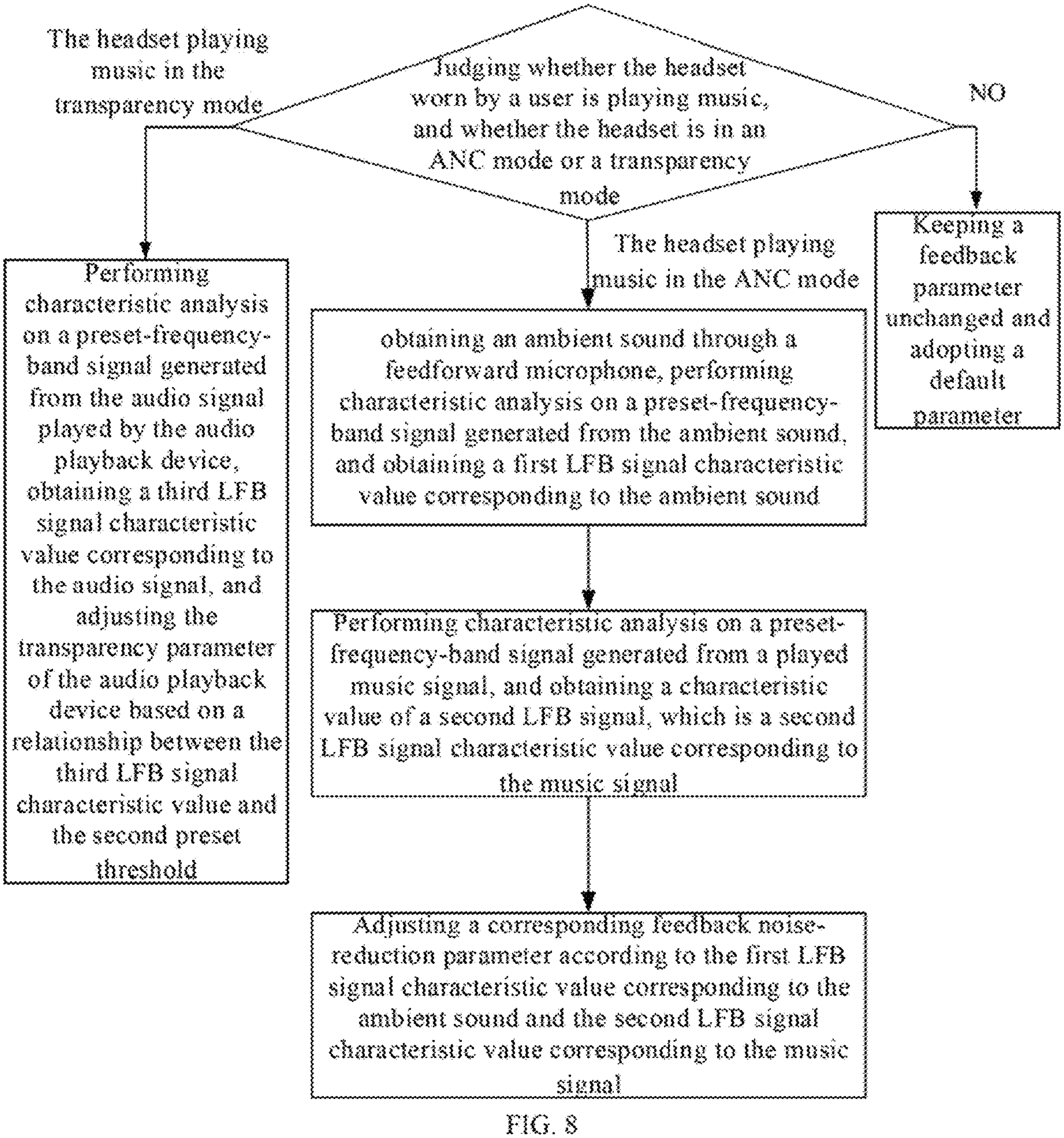
FIG. 8 is a flowchart of an audio data processing method according to some embodiments of the present disclosure.

In some embodiments, the audio playback device is a headset, and an audio data processing method is provided. As shown in FIG. 8, the flowchart of the method includes following operations.

An operation 1 includes: judging whether the headset worn by a user is playing music, and whether the headset is in an ANC mode or a transparency mode.

An operation 2 includes: in response to the headset not playing music or the headset being not in the ANC mode or the transparency mode, keeping a feedback parameter unchanged and adopting a default parameter; the parameter being a feedback parameter with a best ANC effect or a best transparency effect.

An operation 3 includes: performing an operation 4 in response to the headset playing music in the ANC mode; and performing an operation 7 in response to the headset playing music in the transparency mode.

The operation 4 includes: obtaining an ambient sound through a feedforward microphone, performing characteristic analysis on a preset-frequency-band signal generated from the ambient sound, and obtaining a signal characteristic of a first LFB signal, which signal has a frequency in range of such as 50 Hz~700 Hz, corresponding to the ambient sound signal, that is, obtaining a first LFB signal characteristic value corresponding to the ambient sound.

It may be understood that, the ambient sound signal is obtained through the feedforward microphone, and fast Fourier transform or wavelet transform is performed on the obtained ambient sound signal, so that frequency-response distribution data of the ambient sound signal may be obtained. Based on or by using the frequency-response distribution of the ambient sound signal, a maximum value or an average value may be obtained, so as to obtain the signal characteristic value of the first LFB signal, which signal has a frequency in range of such as 50 Hz~700 Hz, corresponding to the ambient sound signal, that is, the first LFB signal characteristic value corresponding to the ambient sound. As shown in FIG. 8, FIG. 8 is a schematic diagram of a flowchart illustrating acquisition and analysis of ambient sound.

An operation 5 includes: performing characteristic analysis on a preset-frequency-band signal generated from a played music signal, and obtaining a characteristic value of a second LFB signal, which has a frequency band of such as 50 Hz~700 Hz, corresponding to the music signal, which is a second LFB signal characteristic value corresponding to the music signal.

It may be understood that, fast Fourier transform or wavelet transform may be performed on the music signal to obtain the frequency-response distribution data. Based on or by using the frequency-response distribution of the music signal, the maximum value or the average value may be obtained to obtain the characteristic value corresponding to the music signal, such as the characteristic value of a low-frequency-band signal at a frequency band of 50 Hz~700 Hz, that is, the second LFB signal characteristic value corresponding to the music signal may be obtained.

An operation 6 includes: adjusting a corresponding feedback noise-reduction parameter according to the first LFB signal characteristic value corresponding to the ambient sound and the second LFB signal characteristic value corresponding to the music signal.

In the ANC mode, the method for adjusting the feedback noise-reduction parameter is shown in Table 1, which may be divided into two cases.

In a first case, based on the first LFB signal characteristic value corresponding to the ambient sound signal, when the ambient sound signal is small at the low-frequency band, that is, when the first LFB signal characteristic value corresponding to the ambient sound signal is less than or equal to a noise-reduction amount of the feedforward noise reduction at the low-frequency band, the low-frequency-band signal generated from the ambient sound signal may be eliminated or cancelled by only using the feedforward noise reduction. In this case, the feedback noise reduction of the audio playback device may be disabled regardless of the characteristic of the music signal.

In the second case, based on the first LFB signal characteristic value corresponding to the ambient sound signal, when the ambient sound signal is large at the low-frequency band, that is, when the first LFB signal characteristic value corresponding to the ambient sound signal is greater than or equal to a noise-reduction amount of feedforward noise reduction at the low-frequency band, the low-frequency-band signal generated from the ambient sound signal cannot be eliminated by only using the feedforward noise reduction. In this case, based on the second LFB signal characteristic value corresponding to the music signal, when the music signal is small at the low-frequency band, that is, when the second LFB signal characteristic value corresponding to the music signal at the low-frequency band fails to reach the value perceivable by the human ear, the impact of the feedback noise reduction on the sound quality may be ignored. Therefore, the target feedback noise-reduction parameter setting adopts an original default parameter, and the parameter may adopt the feedback noise-reduction parameter with the best ANC effect.

When the ambient sound signal is large at the low-frequency band, and when the music signal is large at the low-frequency band and the second LFB signal characteristic value is greater than the value perceivable by the human ear, the feedback noise reduction has a greater impact on the sound quality. It is necessary to adjust the feedback noise-reduction amount by adjusting the feedback noise-reduction parameter according to or based on a noise-reduction requirement of the environment at low-frequency band. The formula is as follows: |feedforward noise-reduction amount+target feedback noise-reduction amount|=|amount of noise of the preset-frequency-band signal generated from the ambient sound|.

According to the above calculation method, the feedforward noise-reduction amount is known, and the amount of noise of the preset-frequency-band signal generated from the ambient sound is also known, so that a required feedback noise-reduction amount, i.e., the target feedback noise-reduction amount, may be obtained. When the required feedback noise-reduction amount is less than or equal to a maximum compensable feedback noise-reduction amount, the feedforward noise-reduction parameter is set according to or based on the required feedback noise-reduction amount. When the required feedback noise-reduction amount is greater than the maximum compensable feedback noise-reduction amount, the feedback noise-reduction parameter is set according to the maximum compensable feedback noise-reduction amount.

TABLE 1

| | Ambient sound signal characteristic | Music signal characteristic | Feedback noise-reduction parameter setting |
|---|---|---|---|
| First case | Small ambient sound at low-frequency band | / | Disabling feedback noise- reduction |
| Second case | Large environment noise at low-frequency band | Small music signal at low-frequency band | Default feedback noise-reduction parameter |
| | | Large music signal at low-frequency band | Adjusting feedback noise- reduction parameter |

An operation 7 includes: in the transparency mode, performing characteristic analysis on a preset-frequency-band signal generated from the audio signal played by the audio playback device, obtaining a third LFB signal characteristic value corresponding to the audio signal, and adjusting the transparency parameter of the audio playback device based on a relationship between the third LFB signal characteristic value and the second preset threshold. It may be understood that the method for adjusting the transparency parameter is shown in Table 2, which may be divided into two cases.

In a first case, based on the third LFB signal characteristic value corresponding to the audio signal, when the audio signal is small at the low-frequency band and the third LFB signal characteristic value fails to reach the value perceivable by the human ear, the impact of the feedback transparency on the sound quality may be ignored. Therefore, a target transparency parameter setting may adopt an original default parameter, and this parameter may be a feedback transparency parameter with a best transparency effect.

In a second case, based on the third LFB signal characteristic value corresponding to the audio signal, when the audio signal is large at the low-frequency band and the third LFB signal characteristic value is greater than the value perceivable by the human ear, the feedback transparency has a greater impact on the audio quality. Therefore, the feedback transparency of the audio playback device is disabled, and only the feedforward transparency parameter is used.

TABLE 2

| | Music signal characteristic | Transparency parameter setting |
|---|---|---|
| First case | Small music signal at low-frequency band | Default feedback transparency parameter |
| Second case | Large music signal at low-frequency band | Disabling feedforward transparency and only using feedforward transparency parameter |

In this embodiment, in the ANC mode, the environment noise is obtained through the feedforward microphone, and characteristic analysis is performed on the environment noise, in addition, in combination of the frequency-response distribution of the played music signal, the feedback noise-cancellation parameter is adaptively determined, thereby reducing the impact of the feedback noise cancellation on the music signal. In the transparency mode, based on the relationship between the characteristic value corresponding to the music signal and the value perceivable by the human ear, the transparency parameter is determined adaptively, thereby reducing the impact of the transparency on the music signal, and intelligently improving the sound quality effect and the playback effect of the music.

It should be understood that, although the operations in the flowcharts of FIGS. 3, 6, and 8 are displayed in sequence as indicated by arrows, these operations are not necessarily performed in sequence as indicated by the arrows. Unless explicitly stated, there is no strict sequence limit for performing these operations. These operations may be performed in other sequences. Moreover, at least some operations in FIGS. 3, 6 and 8 may include multiple sub-operations or multiple stages. These sub-operations or stages are not necessarily performed at a same time point, but may be performed at different time points. These sub-operations or stages are not necessarily performed one by one, but may be performed in turn or alternatively with other operations, sub-operations of other operations, or at least a portion of other stages.

Figure 9:
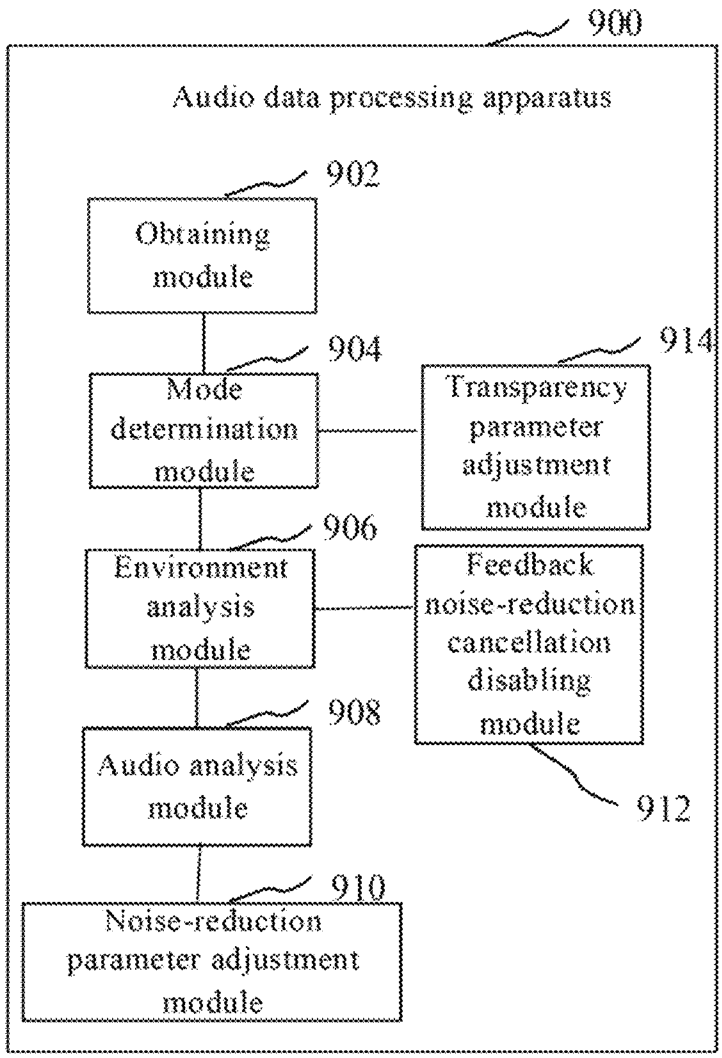
FIG. 9 is a structural block diagram of an audio data processing apparatus according to some embodiments of the present disclosure.

FIG. 9 is a structural block diagram of an audio data processing apparatus 900 according to some embodiments of the present disclosure. As shown in FIG. 9, the audio data processing apparatus 900 applied to or configured in an audio playback device includes an obtaining module 902, a mode determination module 904, an environment analysis module 906, an audio analysis module 908, and a noise-reduction parameter adjustment module 910.

The obtaining module 902 is configured to: acquire a current audio-playback mode of an audio playback device.

The mode determination module 904 is configured to: enter the environment analysis module 906 in response to the current audio-playback mode being the ANC mode.

The environment analysis module 906 is configured to: obtain or collect an ambient sound, performing characteristic analysis on a preset-frequency-band signal generated from an ambient sound signal of the ambient sound, and obtain a first LFB signal characteristic value corresponding to the ambient sound signal.

The audio analysis module 908 is configured to: perform characteristic analysis on a preset-frequency-band signal generated from an audio signal played by the audio playback device, and obtain a second LFB signal characteristic value corresponding to the audio signal.

The noise-reduction parameter adjustment module 910 is configured to: adjust a feedback noise-reduction parameter of the audio playback device based on the second LFB signal characteristic value, in response to the first LFB signal characteristic value being greater than a first preset threshold value.

The audio data processing apparatus 900 in some embodiments may be applied to or configured in the audio playback device. The current audio-playback mode of the audio playback device is obtained. In response to the current audio-playback mode being the ANC mode, the ambient sound is obtained, the characteristic analysis is performed on the preset-frequency-band signal generated from the ambient sound signal to obtain the first LFB signal characteristic value corresponding to the ambient sound signal, and the characteristic analysis is performed on the preset-frequency-band signal generated from the audio signal played by the audio playback device to obtain the second LFB signal characteristic value corresponding to the audio signal. In response to the first LFB signal characteristic value being greater than the first preset threshold value, the feedback noise-reduction parameter of the audio playback device is adjusted based on the second LFB signal characteristic value. In the ANC mode, in a case where the characteristic of the ambient sound meets a preset condition, different feedback noise-reduction parameters correspond to different second LFB signal characteristic values. Therefore, the feedback noise-reduction parameter may be dynamically adjusted according to or based on the characteristics of the ambient sound signal and the audio signal, thereby reducing the impact of the feedback noise reduction on the quality of the audio signal, reducing distortion and noise, and improving the audio playback quality.

In some embodiments, the apparatus includes a feedback noise-reduction disabling module 912.

The feedback noise-reduction disabling module 912 is configured to: disable the feedback noise reduction of the audio playback device in response to the first LFB signal characteristic value being less than or equal to the first preset threshold.

In this embodiment, by comparing the first LFB signal characteristic value corresponding to the ambient sound signal with the first preset threshold value, the small ambient sound signal at the low-frequency band is automatically identified, the feedback noise reduction is not required, and the ambient sound signal at low-frequency band may be eliminated by only using the feedforward noise reduction. Therefore, the feedback noise reduction of the audio playback device may be disable to reduce the impact of the feedback noise reduction on the quality of the audio signal.

In some embodiments, the noise-reduction parameter adjustment module 910 is further configured to: take a default feedback noise-reduction parameter as the target feedback noise-reduction parameter in response to the second LFB signal characteristic value being less than or equal to a value perceivable by a human ear; and obtain a target feedback noise-reduction amount based on a feedforward noise-reduction amount and an amount of noise of the preset-frequency-band signal generated from the ambient sound in response to the second LFB signal characteristic value being greater than the value perceivable by the human ear, and obtain the target feedback noise-reduction parameter based on the target feedback noise-reduction amount.

In this embodiment, based on the second LFB signal characteristic value corresponding to the audio signal, when the audio signal is small or large at the low-frequency band, that is, when the audio signal is less than or equal to the value perceivable by the human ear or when the audio signal is greater than the value perceivable by the human ear, the feedback noise-reduction parameter may be determined in different ways, so that the feedback noise-reduction parameter may be determined adaptively, thereby reducing the impact of the feedback noise reduction on audio quality, and intelligently improving the audio playback quality.

In some embodiments, the noise-reduction parameter adjustment module 910 is configured to: obtain the maximum compensable feedback noise-reduction amount; obtain the target feedback noise-reduction parameter based on the target feedback noise-reduction amount in response to the target feedback noise-reduction amount being less than or equal to the maximum compensable feedback noise-reduction amount; and obtain the target feedback noise-reduction parameter based on the maximum compensable feedback noise-reduction amount in response to the target feedback noise-reduction amount being greater than the maximum compensable feedback noise-reduction amount.

In this embodiment, by comparing the target feedback noise-reduction amount with the maximum compensable feedback noise-reduction amount, the target feedback noise-reduction parameter is determined in different ways based on the comparison result, so that the feedback noise-reduction parameter may be determined adaptively, thereby reducing the impact of the feedback noise reduction on the audio quality, and intelligently improving the audio playback quality.

In some embodiments, the target feedforward noise-reduction mount is calculated by the following formula: |feedforward noise-reduction amount+target feedback noise-reduction amount|=|amount of noise of the preset-frequency-band signal generated from the ambient sound|.

In this embodiment, the target feedback noise-reduction amount may be quickly calculated according to or based on or by using the feedforward noise-reduction amount and the amount of noise of the preset-frequency-band signal generated from the ambient sound in the formula, thereby improving a convenience and an accuracy of determining the target feedback noise-reduction amount.

In some embodiments, the apparatus includes a transparency parameter adjustment module 914. The mode determination module 902 is also configured to enter the transparency parameter adjustment module 914 in response to the current audio-playback mode being the transparency mode.

The transparency parameter adjustment module 914 is configured to: perform characteristic analysis on the preset-frequency-band signal generated from the audio signal played by the audio playback device to obtain a third LFB signal characteristic value corresponding to the audio signal; and adjust the transparency parameter of the audio playback device based on a relationship between the third LFB signal characteristic value and the second preset threshold.

In the audio data processing apparatus 900 in some embodiments, based on the third LFB signal characteristic value corresponding to the audio signal, when the audio signal is small or large at the low-frequency band, the transparency parameter of the audio playback device may be determined in different ways, so that the transparency parameter may be determined adaptively, thereby reducing the impact of the transparency parameter on the audio quality, and intelligently improving the audio playback quality.

In some embodiments, the transparency parameter adjustment module 914 is configured to: take a default feedback transparency parameter as a target transparency parameter in response to the third LEB signal characteristic value being less than or equal to the value perceivable by the human ear; in response to the third LFB signal characteristic value being greater than the value perceivable by the human ear, disable the feedback transparency of the audio playback device, and take the feedforward transparency parameter as the target transparency parameter.

In the audio data processing apparatus 900 in some embodiments, the third LFB signal characteristic value corresponding to the audio signal is compared with the value perceivable by the human ear. Based on the comparison result, the default feedback transparency parameter is selected, or the feedback transparency of the audio playback device is disabled and the feedforward transparency parameter is selected. When the audio signal is small or large at the low-frequency band, a matching target transparency parameter is adaptively selected and a target transparency parameter is dynamically set, thereby reducing the impact of transparency parameter on the audio quality and improving the audio playback quality.

The description of the audio data processing apparatus may refer to the description of the audio data processing method above, which is not repeated. Some or all modules in the audio data processing apparatus may be implemented by software, hardware and their combination. The above modules may be embedded in or independent of a processor in a computer device in a form of hardware, or stored in a memory in the computer device in a form of software, so that the processor may call and perform operations corresponding the above modules.

Figure 10:
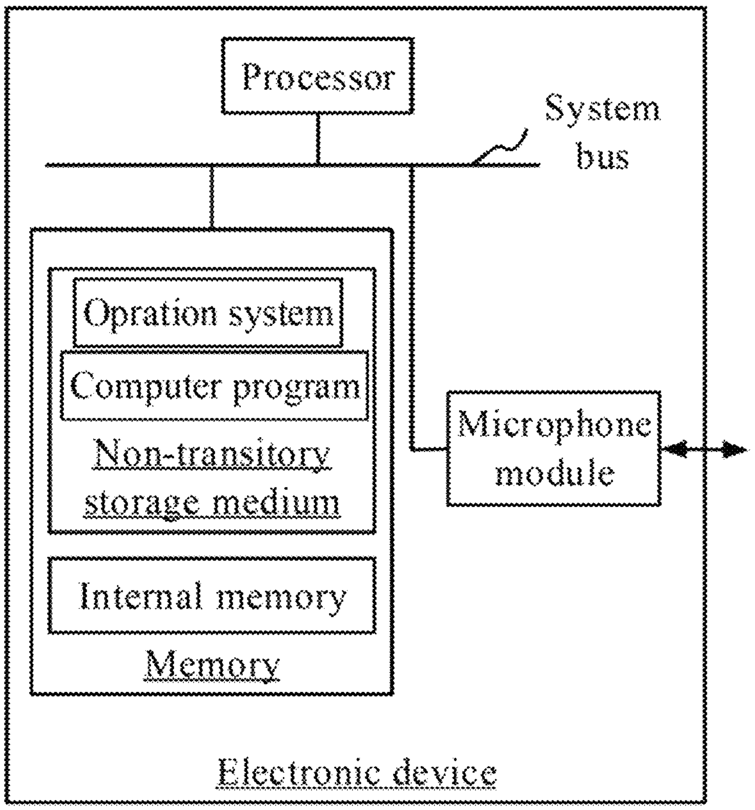
FIG. 10 is a block diagram of an internal structure of an electronic device according to some embodiments of the present disclosure.

FIG. 10 is a block diagram of an internal structure of an electronic device according to some embodiments of the present disclosure. As shown in FIG. 10, the electronic device includes a processor, a memory, and a microphone module connected through a system bus. The processor is configured to provide computing and control capabilities and support operation of the entire electronic device. The processor may include a super resolution processing chip. The memory may include a non-transitory storage medium and an internal memory. The non-transitory storage medium stores an operating system and a computer readable instruction. The computer-readable instruction may be executed by the processor to implement the audio data processing method provided by the above embodiments. The internal memory provides a cached running environment for the computer-readable instruction of the operating system in the non-transitory storage medium. The microphone module is configured to obtain an ambient sound and an audio signal. The electronic device may be a wired headset, a Bluetooth headset, or a playable audio watch, etc.

Each module in the audio data processing apparatus provided in some embodiments of the present disclosure may be implemented in a form of a computer-readable instruction. The computer readable instruction may be run on a terminal or a server. A program module included in the computer readable instruction may be stored on a memory of the terminal or the server. When the computer-readable instruction is executed by a processor, the operations of the method described in some embodiments of the present disclosure are implemented.

An electronic device including a memory and one or more processors. The memory stores a computer-readable instruction, one or more non-transitory storage medium storing the computer-readable instruction. When the computer-readable instruction is executed by the one or more processors, the one or more processors implement the operations of the audio data processing method in any embodiment of the present disclosure.

Some embodiments of the present disclosure also provide a computer-readable storage medium, which is a non-transitory computer-readable storage medium including one or more computer-readable instructions. When computer-readable instructions are executed by one or more processors, the processors perform the operations of the audio data processing method in any embodiment of the present disclosure.

A computer-readable instruction product including instructions is provided. When the computer-readable instruction product runs on a computer, the computer performs the audio data processing method in any embodiment of the present disclosure.

Any memory, storage, database, or other medium described in some embodiments of the present disclosure may be applied to a non-transitory and/or a transitory memory. The non-transitory memory may include a read-only memory (ROM), a programmable ROM (PROM), an electrically programmable ROM (EPROM), an electrically erasable programmable ROM (EEPROM), or a flash memory. The transitory memory may include a random access memory (RAM) served as an external cache memory. As an illustration rather than limitation, the RAM is available in many forms, such as a static RAM (SRAM), a dynamic RAM (DRAM), a synchronous DRAM (SDRAM), a dual data rate SDRAM (DDR SDRAM), an enhanced SDRAM (ESDRAM), a synchronous link DRAM (SLDRAM), a rambus direct RAM (RDRAM), a direct RDRAM (DRDRAM), and a rambus dynamic RAM (RDRAM).

The above embodiments only are some embodiments of the present disclosure, and the description is specific and detailed, which is not understood as a limitation of the scope of the present disclosure. It should be noted that for those skilled in the art, modifications and improvements may be made without departing from the concept of the present disclosure, which are within the protection scope of the present disclosure. Therefore, the scope of protection of the present disclosure shall be subject to the appended claims.

What is claimed is:

1. An audio data processing method performed by an audio playback device, comprising:

obtaining a current audio playback mode of the audio playback device;

in response to the current audio playback mode being an active noise cancellation mode, obtaining an ambient sound signal from an ambient sound, performing characteristic analysis on a preset-frequency-band signal generated from the ambient sound signal, and obtaining a first low-frequency-band (LFB) signal characteristic value corresponding to the ambient sound;

performing characteristic analysis on a preset-frequency-band signal generated from an audio signal played by the audio playback device, and obtaining a second LFB signal characteristic value corresponding to the audio signal; and adjusting a feedback noise-reduction parameter of the audio playback device based on the second LFB signal characteristic value, in response to the first LFB signal characteristic value being greater than a first preset threshold value.

2. The method as claimed in claim 1, wherein after the performing characteristic analysis on a preset-frequency-band signal generated from an audio signal played by the audio playback device, and obtaining a second LFB signal characteristic value corresponding to the audio signal, the method further comprises:

disabling feedback reduction of the audio playback device, in response to the first LFB signal characteristic value being less than or equal to the first preset threshold.

3. The method as claimed in claim 1, wherein the adjusting a feedback noise-reduction parameter of the audio playback device based on the second LFB signal characteristic value, in response to the first LFB signal characteristic value being greater than a first preset threshold value comprises:

setting a default feedback noise-reduction parameter as a target feedback noise-reduction parameter, in response to the second LFB signal characteristic value being less than or equal to a value perceivable by the human ear; and obtaining a target feedback noise-reduction amount based on a feedforward noise-reduction amount and an amount of noise of the preset-frequency-band signal generated from the ambient sound signal in response to the second LFB signal characteristic value being greater than the value perceivable by the human ear, and obtaining the target feedback noise-reduction parameter based on the target feedback noise-reduction amount;

wherein the feedforward noise-reduction amount is determined in a debugging stage of the audio playback device.

4. The method as claimed in claim 1, wherein the obtaining the target feedback noise-reduction parameter based on the target feedback noise-reduction amount comprises:

obtaining a maximum compensable feedback noise-reduction amount;

obtaining the target feedback noise-reduction parameter based on the target feedback noise-reduction amount in response to the target feedback noise-reduction amount being less than or equal to the maximum compensable feedback noise-reduction amount; and obtaining the target feedback noise-reduction parameter according to the maximum compensable feedback noise-reduction amount in response to the target feedback noise-reduction amount being greater than the maximum compensable feedback noise-reduction amount.

5. The method as claimed in claim 4, wherein the target feedback noise-reduction amount is calculated through a following formula:

|the feedforward noise-reduction amount+the target feedback noise-cancellation amount|=|the amount of noise of the preset-frequency-band signal generated from the ambient sound|.

6. The method as claimed in claim 1, wherein after the obtaining a current audio playback mode of the audio playback device, the method further comprises:

in response to the current audio playback mode being a transparency mode, performing characteristic analysis on a preset-frequency-band signal generated from the audio signal played by the audio playback device, and obtaining a third LFB signal characteristic value corresponding to the audio signal; and adjusting a transparency parameter of the audio playback device based on a relationship between the third LFB signal characteristic value and a second preset threshold value;

wherein the adjusting a transparency parameter of the audio playback device based on a relationship between the third LFB signal characteristic value and a second preset threshold value comprises:

setting a default feedback transparency parameter as a target transparency parameter in response to the third LFB signal characteristic value being less than or equal to a value perceivable by the human ear; and in response to the third LFB signal characteristic value being greater than the value perceivable by the human ear, disabling a feedback transparency of the audio playback device, and setting a feedforward transparency parameter as the target transparency parameter.

7. An electronic device, comprising a memory and one or more processors; wherein the memory stores a computer-readable instruction, the one or more processors perform operations of an audio data processing method in response to the computer-readable instruction being executed by the one or more processors;

wherein the method comprises:

obtaining a current audio playback mode of the audio playback device;

in response to the current audio playback mode being an active noise cancellation mode, obtaining an ambient sound signal from an ambient sound, performing characteristic analysis on a preset-frequency-band signal generated from the ambient sound signal, and obtaining a first low-frequency-band (LFB) signal characteristic value corresponding to the ambient sound;

performing characteristic analysis on a preset-frequency-band signal generated from an audio signal played by the audio playback device, and obtaining a second LFB signal characteristic value corresponding to the audio signal; and adjusting a feedback noise-reduction parameter of the audio playback device based on the second LFB signal characteristic value, in response to the first LFB signal characteristic value being greater than a first preset threshold value.

8. The electronic device as claimed in claim 7, wherein after the performing characteristic analysis on a preset-frequency-band signal generated from an audio signal played by the audio playback device, and obtaining a second LFB signal characteristic value corresponding to the audio signal, the method further comprises:

disabling feedback noise-reduction of the audio playback device, in response to the first LFB signal characteristic value being less than or equal to the first preset threshold.

9. The electronic device as claimed in claim 7, wherein the adjusting a feedback noise-reduction parameter of the audio playback device based on the second LFB signal characteristic value, in response to the first LFB signal characteristic value being greater than a first preset threshold value comprises:

setting a default feedback noise-reduction parameter as a target feedback noise-reduction parameter, in response to the second LFB signal characteristic value being less than or equal to a value perceivable by the human ear; and obtaining a target feedback noise-reduction amount based on a feedforward noise-reduction amount and an amount of noise of the preset-frequency-band signal generated from the ambient sound signal in response to the second LFB signal characteristic value being greater than the value perceivable by the human ear, and obtaining the target feedback noise-reduction parameter based on the target feedback noise-reduction amount.

10. The electronic device as claimed in claim 9, wherein the feedforward noise-reduction amount is determined in a debugging stage of the audio playback device.

11. The electronic device as claimed in claim 7, wherein the obtaining the target feedback noise-reduction parameter based on the target feedback noise-reduction amount comprises:

obtaining a maximum compensable feedback noise-reduction amount;

obtaining the target feedback noise-reduction parameter based on the target feedback noise-reduction amount in response to the target feedback noise-reduction amount being less than or equal to the maximum compensable feedback noise-reduction amount; and obtaining the target feedback noise-reduction parameter according to the maximum compensable feedback noise-reduction amount in response to the target feedback noise-reduction amount being greater than the maximum compensable feedback noise-reduction amount.

12. The electronic device as claimed in claim 11, wherein the target feedback noise-reduction amount is calculated through a following formula:

|the feedforward noise-reduction amount+the target feedback noise-cancellation amount|=|the amount of noise of the preset-frequency-band signal generated from the ambient sound|.

13. The electronic device as claimed in claim 7, wherein after the obtaining a current audio playback mode of the audio playback device, the method further comprises:

in response to the current audio playback mode being a transparency mode, performing characteristic analysis on a preset-frequency-band signal generated from the audio signal played by the audio playback device, and obtaining a third LFB signal characteristic value corresponding to the audio signal; and adjusting a transparency parameter of the audio playback device based on a relationship between the third LFB signal characteristic value and a second preset threshold value.

14. The electronic device as claimed in claim 13, wherein the adjusting a transparency parameter of the audio playback device based on a relationship between the third LFB signal characteristic value and a second preset threshold value comprises:

setting a default feedback transparency parameter as a target transparency parameter in response to the third LFB signal characteristic value being less than or equal to a value perceivable by the human ear; and in response to the third LFB signal characteristic value being greater than the value perceivable by the human ear, disabling a feedback transparency of the audio playback device, and setting a feedforward transparency parameter as the target transparency parameter.

15. A non-transitory computer-readable storage medium, storing one or more computer-readable instructions; wherein in response to computer-readable instructions being executed by one or more processors, the one or more processors perform operations of an audio data processing method, and the method comprises:

obtaining a current audio playback mode of the audio playback device;

in response to the current audio playback mode being an active noise cancellation mode, obtaining an ambient sound signal from an ambient sound performing characteristic analysis on a preset-frequency-band signal generated from the ambient sound signal, and obtaining a first low-frequency-band (LFB) signal characteristic value corresponding to the ambient sound;

performing characteristic analysis on a preset-frequency-band signal generated from an audio signal played by the audio playback device, and obtaining a second LFB signal characteristic value corresponding to the audio signal; and adjusting a feedback noise-reduction parameter of the audio playback device based on the second LFB signal characteristic value, in response to the first LFB signal characteristic value being greater than a first preset threshold value.

16. The non-transitory computer-readable storage medium as claimed in claim 15, wherein after the performing characteristic analysis on a preset-frequency-band signal generated from an audio signal played by the audio playback device, and obtaining a second LFB signal characteristic value corresponding to the audio signal, the method further comprises:

disabling feedback noise-reduction of the audio playback device, in response to the first LFB signal characteristic value being less than or equal to the first preset threshold.

17. The non-transitory computer-readable storage medium as claimed in claim 15, wherein the adjusting a feedback noise-reduction parameter of the audio playback device based on the second LFB signal characteristic value, in response to the first LFB signal characteristic value being greater than a first preset threshold value comprises:

setting a default feedback noise-reduction parameter as a target feedback noise-reduction parameter, in response to the second LFB signal characteristic value being less than or equal to a value perceivable by the human ear; and obtaining a target feedback noise-reduction amount based on a feedforward noise-reduction amount and an amount of noise of the preset-frequency-band signal generated from the ambient sound signal in response to the second LFB signal characteristic value being greater than the value perceivable by the human ear, and obtaining the target feedback noise-reduction parameter based on the target feedback noise-reduction amount;

wherein the feedforward noise-reduction amount is determined in a debugging stage of the audio playback device.

18. The non-transitory computer-readable storage medium as claimed in claim 15, wherein the obtaining the target feedback noise-reduction parameter based on the target feedback noise-reduction amount comprises:

obtaining a maximum compensable feedback noise-reduction amount;

obtaining the target feedback noise-reduction parameter based on the target feedback noise-reduction amount in response to the target feedback noise-reduction amount being less than or equal to the maximum compensable feedback noise-reduction amount; and obtaining the target feedback noise-reduction parameter according to the maximum compensable feedback noise-reduction amount in response to the target feedback noise-reduction amount being greater than the maximum compensable feedback noise-reduction amount.

19. The non-transitory computer-readable storage medium as claimed in claim 18, wherein the target feedback noise-reduction amount is calculated through a following formula:

|the feedforward noise-reduction amount+the target feedback noise-cancellation amount|=|the amount of noise of the preset-frequency-band signal generated from the ambient sound|.

20. The non-transitory computer-readable storage medium as claimed in claim 15, wherein after the obtaining a current audio playback mode of the audio playback device, the method further comprises:

in response to the current audio playback mode being a transparency mode, performing characteristic analysis on a preset-frequency-band signal generated from the audio signal played by the audio playback device, and obtaining a third LFB signal characteristic value corresponding to the audio signal; and adjusting a transparency parameter of the audio playback device based on a relationship between the third LFB signal characteristic value and a second preset threshold value;

wherein the adjusting a transparency parameter of the audio playback device based on a relationship between the third LFB signal characteristic value and a second preset threshold value comprises:

setting a default feedback transparency parameter as a target transparency parameter in response to the third LFB signal characteristic value being less than or equal to a value perceivable by the human ear; and in response to the third LFB signal characteristic value being greater than the value perceivable by the human ear, disabling a feedback transparency of the audio playback device, and setting a feedforward transparency parameter as the target transparency parameter.

* * * * *